A. R. CUNNIUS.
PROCESS OF MANUFACTURING HORNS.
APPLICATION FILED JULY 10, 1908.
1,112,686.
Patented Oct. 6, 1914.
4 SHEETS—SHEET 1.
Fig.1.
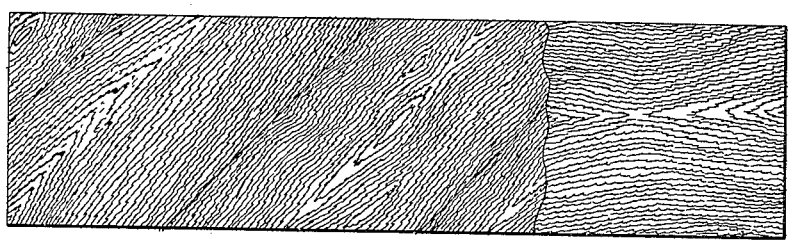
Fig.2.
Fig.5.
Fig.3. Fig.4.
Fig.6.
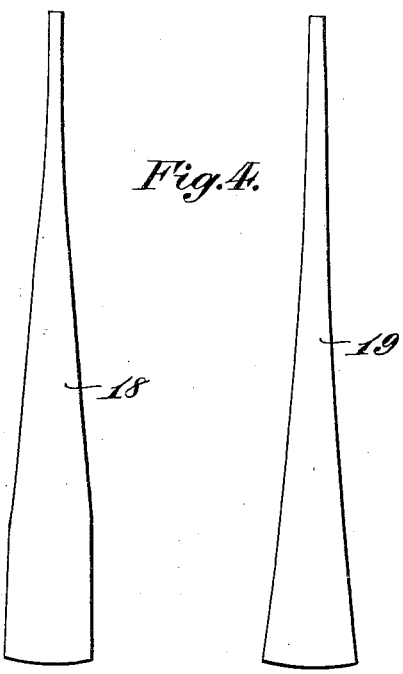 
Fig.7.
WITNESSES:
Jas. C. Wobensmith
Mae Hofmann
INVENTOR
Alfred R. Cunnius,
BY
Tho. F. Croasdale
ATTORNEY.

A. R. CUNNIUS.
PROCESS OF MANUFACTURING HORNS.
APPLICATION FILED JULY 10, 1908.

1,112,686.

Patented Oct. 6, 1914.
4 SHEETS—SHEET 2.

WITNESSES:
Jas. C. Wobensmith
Mae Hofmann

INVENTOR
Alfred R. Cunnius,
BY
Jno T Coasdale
ATTORNEY.

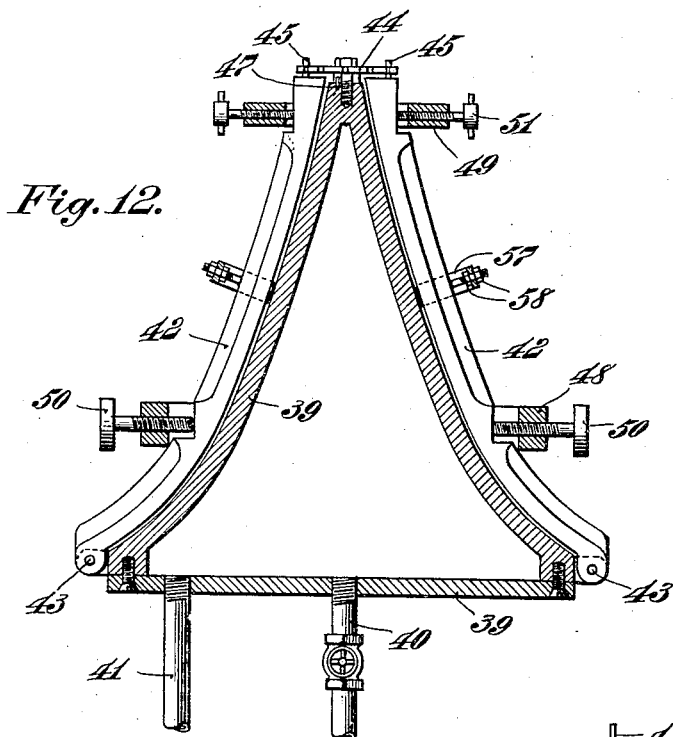
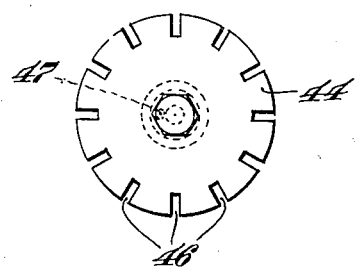
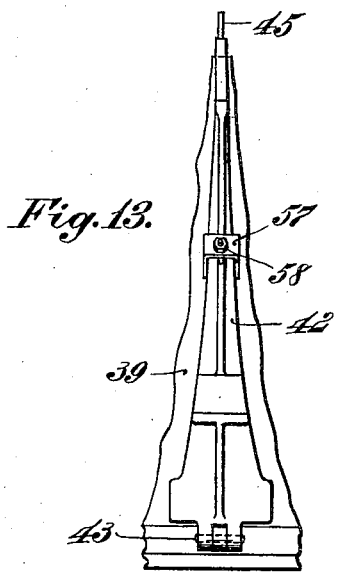

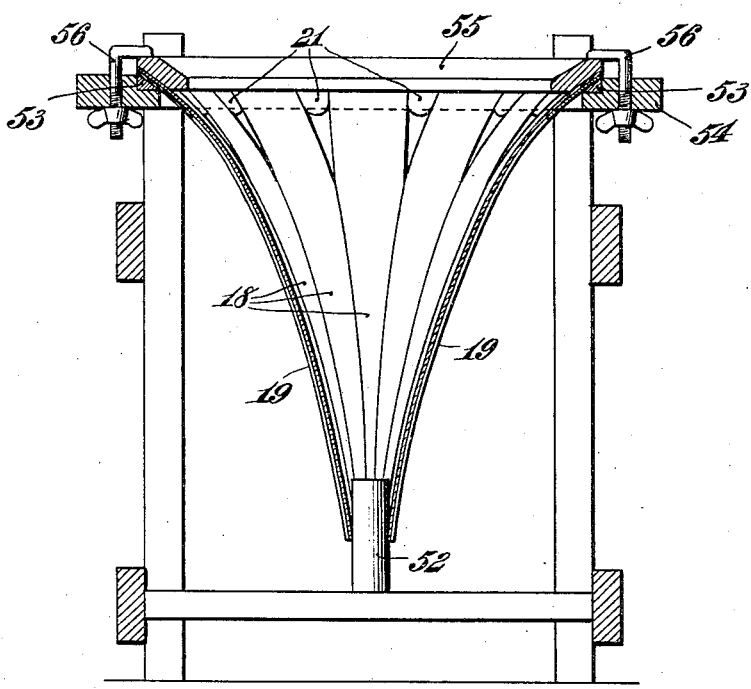
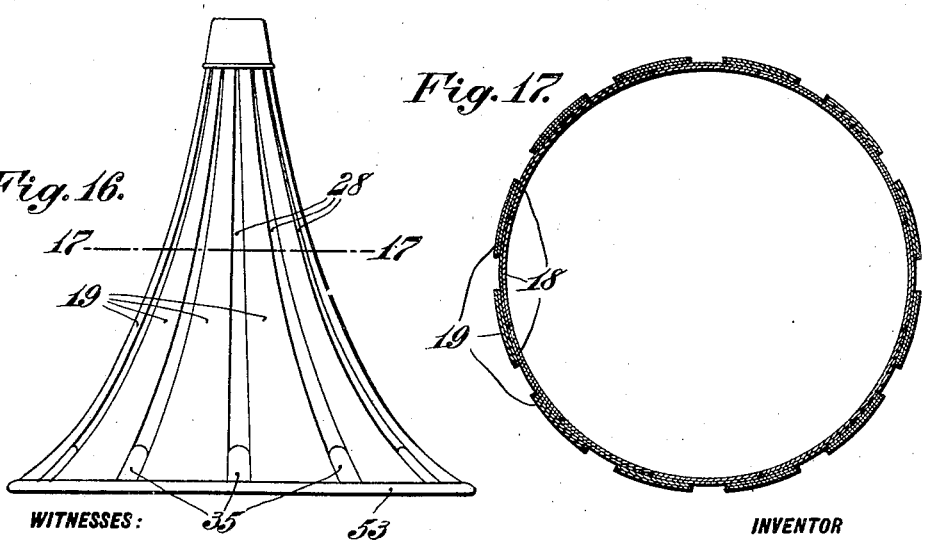

UNITED STATES PATENT OFFICE.

ALFRED R. CUNNIUS, OF BROOKLYN, NEW YORK, ASSIGNOR OF ONE-HALF TO LIPMAN KAISER, OF EAST ORANGE, NEW JERSEY.

PROCESS OF MANUFACTURING HORNS.

1,112,686.     Specification of Letters Patent.     Patented Oct. 6, 1914.

Application filed July 10, 1908. Serial No. 442,889.

*To all whom it may concern:*

Be it known that I, ALFRED R. CUNNIUS, a citizen of the United States, residing at Brooklyn, in the county of Kings and State of New York, have invented a new and useful Process of Manufacturing Horns, of which the following is a specification.

My invention relates to improvement in the process of manufacturing horns of wood or other fibrous material.

The object of the invention is to provide improved method for manufacturing said horns which shall result in a structure which shall be strong and durable and attractive in appearance, and which shall at the same time, have the desired resonant qualities.

Figure 8:
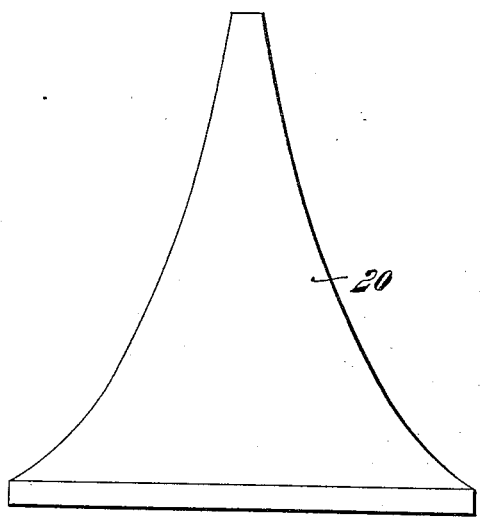
Figure 9:
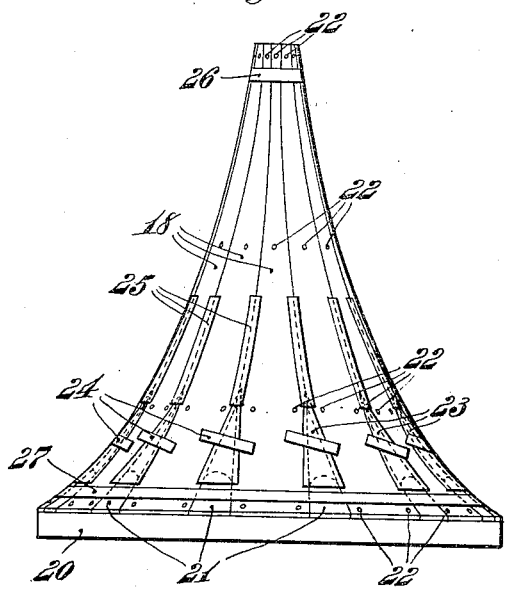
Figure 10:
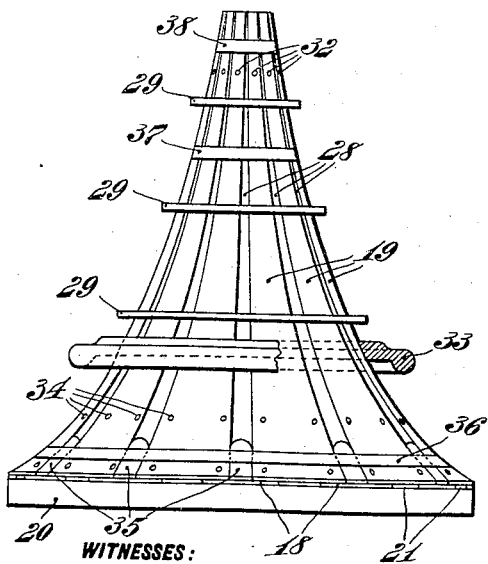
Figure 11:
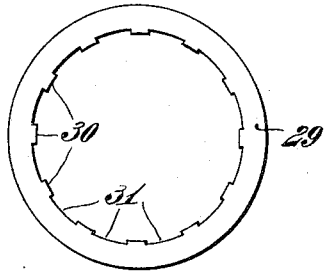

Referring to the drawings:—Figure 1 is a plan view of a composite piece of cross-grained veneer part broken away. Fig. 2 is an edge view of the same. Fig. 3 is a plan view of a rib constituting one of the elements of my horn, which is cut from the piece shown in Figs. 1 and 2. Fig. 4 is a plan view of another rib cut from said composite piece; the same constituting another element of my horn. Fig. 5 is a plan view of an internal ornamental piece constituting another element of my horn and which is cut from the composite piece shown in Fig. 1. Fig. 6 is a plan view of a filling piece constituting another element of my horn. Fig. 7 is a plan view of an external ornamental piece forming another element of my horn, and cut from said composite piece. Fig. 8 is a side elevation of the form, preferably of wood, upon which the various elements of the horn are temporarily assembled. Fig. 9 is a similar view of the form with the elements constituting the first, or inner layer of the horn assembled thereon. Fig. 10 is a similar view showing the elements constituting the second or outer layer of the horn also assembled thereon. Fig. 11 is a plan view of one of the spacing rings which is employed in the step of the process shown in Fig. 10. Fig. 12 is a vertical section of the gluing form and clamping devices. Fig. 13 is a side elevation of one of the clamping arms shown in Fig. 12. Fig. 14 is a plan view of the device for properly spacing the upper extensions of the clamping arms. Fig. 15 is a vertical section of the device for clamping the ring, or rim member, to the outer end of the horn during the gluing thereof. Fig. 16 is an elevation of a completed horn. Fig. 17 is a cross-section on line 17—17 of Fig. 16, on an enlarged scale.

Similar numerals refer to similar parts throughout the several views.

I find that an extremely suitable material, out of which to make the elements composing the horn, consists of a composite piece of cross-grain veneer, that is two layers of veneer glued together with the grain of one running at an angle at approximately forty-five degrees with that of the other. From such composite piece are cut various elements or tapered strips used in the construction of the horn. The filling piece shown in Fig. 6, may ordinarily be of a single layer of veneering. In Fig. 3, I show one of the tapered elements or strips 18, a number of which are used in the formation of the first, or inner layer of the horn, while in Fig. 4, I show one of the elements or strips 19, a number of which are used in the formation of the second or outer layer of the horn.

Upon a form 20 such as is shown in Fig. 8, which has the exact inner contour of the desired horn, and which is preferably made of wood, I place the required number of strips or elements 18 as shown in Fig. 9. These strips are all in contact with each other throughout their greater extensions, but are separated at their lower extensions leaving inverted V-shaped openings. At the lower extension of these openings the decorating pieces 21 are inserted, as shown in Fig. 9. The strips 18 are then secured by brads to the form 20 as shown in Fig. 18, the brads being indicated by 22. The filling strips 23 are then placed over the balance of the inverted V-shaped opening and secured in place by tapes 24 glued across the same from one element 18 to another element 18. Other tapes 25 serve to secure the several elements 18 together, and further tapes 26 and 27 serve to bind the elements together at the upper and lower extensions of the horn. In this way is formed the first or inner layer of the horn. When the glue has become sufficiently dry or set, the brads are removed from the several elements and the outer layer is then placed upon this inner layer in the following manner. The several elements 19 are placed upon the inner layer in such manner that the line of meeting of any two elements 18 will lie along the middle line of an element 19 so that each element 19 will superimpose substantially a half, or nearly a half, of each of two adjacent elements 18. The elements 19 are so shaped and proportioned that channels 28 are left therebetween, as shown in Fig. 10.

Rings 29 having lugs 30 and recesses 31, the lugs corresponding to the channels 28, and the recesses corresponding to the ribs or elements 19, both in number and dimension, at certain positions on the horn, serve to properly space said elements 19; three of these rings 29 are shown in position in Fig. 10. These elements 19 are fastened by brads 32 near the top of the form, and the heavier ring 33 is placed on the composite structure to bring the elements 19 and the first layer which they superimpose tight against the form 20. Thereupon the brads 34 are driven through the elements 19, into the form 20, and the rings removed. Small decorating pieces 35 are inserted between the lower ends of the strips or elements 19, as shown in Fig. 10. Binding tapes 36, 37 and 38 are then glued around the lower extremity and two places near the upper extremity. When the glue is sufficiently dry, the brads are all removed and the two layers are separated from the form 20 and from each other. The inner layer is then placed upon a gluing form, such for example as is shown in Fig. 12. This may be a hollow form having the exact exterior contour of the interior of the horn, that is similar to the contour of the form 20, and may be provided with means for heating the interior thereof, such for example, the steam pipes 40 and 41. The outside layer or skeleton of the horn is then provided with a coat of glue upon its entire inner surface, and glue is also spread over all the linen or tapes on the inside skeleton or layer. The outside layer or skeleton is then accurately placed upon the inside skeleton; the elements 19 having the same relative positions with respect to elements 18 as they had when originally assembled on the form 8, as explained in connection with Fig. 10. Any suitable means for securing the proper position of the outside layer with respect to the inside layer may be adopted.

Pivotally secured at 43 to the gluing form 39, are a number of arms 42 corresponding in number, shape and position with the elements 19 which they are adapted to superimpose. It will be understood that these arms are swung clear or out of the way of the form 39 when the two layers or skeleton of the horn are placed thereon. The arms are then swung back into the position shown in Fig. 12. A spacing member 44 which is clearly shown in Fig. 14, is secured to the top of form 39 and is provided with recesses 46 to coöperate with the pins 45 at the top of arms 42. This member 44 has a fixed relation with form 39, due to the pin 47, and serves to properly locate the upper extensions of said clamping members 42.

When the members 42 have been brought into the position shown in Fig. 12, rings 48 and 49 provided with clamp screws 50 and 51 are brought in position and the screws operated to force the clamping members 42 firmly against the elements 19. Proper recesses or notches are provided in the clamping members 42, to form suitable seats for the screws 50, as shown in Fig. 12.

It might be noted that the lower ends of the clamping members 42 are widened so as to extend partly over the decorating pieces 35. The result of which is that all the elements forming the outer layer of the horn are pressed firmly against the elements of the inner layer during the process of gluing and a final definite shape conforming to the outer contour of the gluing form 39 is given to the horn.

It will be understood that the pressure exerted by the screws 50 and 51 would tend to move the arms 42 upwardly on form 39 if it were not for their pivotal engagement therewith, as at 43. It is obvious that any other equivalent means may be adopted for preventing relative movement between members 42 and form 39 either by stops at the upper end of the form, or hooks or lugs at the lower end.

As a means for keeping the elements or strips 19 in perfect alinement with arms 42, during the gluing operation, I may provide arms 42 with members 57, see Figs. 12 and 13. These members are U-shaped and embrace the arms or members 42 having their two extensions slightly below said arms to form guides for the strips or elements 19. The said members 57 are secured to a pin or lug projecting from member 42 by lock nuts 58. The pressure exerted between the clamping members 42 and the gluing form 39, is an efficient one, and the glue that is squeezed from under the elements 19 into the channels 28 is then removed.

When the horn is sufficiently dry or set, it is removed from the gluing form 39, and all other superfluous glue is then removed from the horn. The wooden ring or rim member 53, having been properly bent, and its joint glued, is placed in the iron ring or seat 54, which is properly located or centered with respect to pin 52. The horn is then placed in the frame shown in Fig. 15, being centered as to its small end, by the pin 52. Glue is also provided between the horn and the rim member. A second clamping ring 55 is then placed on top of said flaring end of the horn, as shown in Fig. 15 and the clamps 56 are operated to press the horn and rim member 53 firmly together until the glue has set. When the glue has dried sufficiently, the horn is ready to be cleaned, sandpapered and finished. A suitable cap is placed on the small end of the horn and the same is then ready for use as shown in Fig. 16. It is to be noted that this cap may be of sufficient length to conceal bands 26 and 38 and it will be understood that bands 36 and 37 may be removed when the horn is cleaned. Band 27 about the larger ends of strips 18 is prevented from showing between said strips and strips 19, and is effectually hidden by filling pieces 21 and 35, respectively. By an inspection of Fig. 17, it will be seen that the completed body of the horn is composed of a brake joint structure of composite layers or strips 18 and 19.

As indicated in Fig. 1, the grain of one layer of the veneering runs longitudinally with said strip while the grain of the other layer is inclined to the grain of the first layer at an angle say forty-five degrees. The strips or elements 18 and 19 are cut so that the grain on one side will be longitudinal thereto while the grain on the other side will be inclined or diagonal to the longitudinal extension of the strip. It is further to be understood that these strips are so cut with respect to the direction of the grain of the two layers of veneer composing the strips and are so assembled, that is, the element 18 relatively to elements 19, that the grain of the layer 18 which comes in contact with the layer 19 runs in a direction practically at an angle of ninety degrees to the direction of the grain of said contacting layer of strip 19. The result of this construction is that the sides of the strips 18 and 19 which are glued together have the grain of their contacting faces running at right angles with each other, while on the outer surface of the horn and on the inner surface of the horn the grain runs straight or corresponding to the longitudinal extension of said strips.

What I claim is:—

1. The method of making a phonograph horn, which consists in assembling separate layers of longitudinally extending tapered strips with reinforcing tapes between the layers, both layers being glued to said tapes.

2. In the method of making a horn of fibrous material, the following steps, assembling a layer of tapered elements upon a form and securing said elements together by adhesive means and then assembling a second layer of tapered elements upon the first layer and securing said second layer of elements together, so that said layer can be moved as one body, then separating said second layer from the first layer and applying an adhesive material between the same and then clamping said layers together on a form of proper contour with the joints between the elements of one layer breaking with the joints between the elements of the other layer.

3. In the method of making a horn of fibrous material, the following steps, assembling a layer of tapered elements upon a form and securing said elements together by adhesive means and then assembling a second layer of tapered elements upon the first layer and securing said second layer of elements together, so that said layer can be moved as one body, then separating said second layer from the first layer and applying an adhesive material between the same and then clamping said layers together on a form of proper contour, with the joints between the elements of one layer breaking with the joints between the elements of the other layer and then clamping a margin ring or band provided with adhesive material upon the outer or flaring end of the structure previously formed.

4. The method of making a horn, which consists in providing a plurality of strips or elements each made of two layers of veneer, the grain of one layer crossing the grain of another, arranging said elements in two layers in break-joint fashion so that the grain showing on the inner and outer surface of the horn shall run longitudinally with the strips while the grain of the other layers of veneer shall be inclined thereto and securing said layers together in any suitable way.

5. The method of making a phonograph horn, which consists in assembling tapered strips of fibrous material upon a form and securing the same temporarily thereto fastening said elements together by adhesive means, then temporarily securing an outer layer of similar elements upon said inner layer in break-joint fashion, pressing said layers firmly against the form to secure the contour thereof, spacing said outer layers so as to leave channels therebetween and inserting decorating pieces at the lower ends of said channels and after separating said layers and providing adhesive material therebetween, and then clamping the same firmly together on the form of desired contour until the adhesive material has set.

6. The method of making a horn, which comprises the assembling first of an inner layer of tapered elements upon a form of desired contour, said elements when assembled forming inverted V-shaped apertures between their lower ends inserting decorating pieces in said recesses and securing the same therein by adhesive material, covering the balance of said recess by a thin strip of fibrous material secured to the tapered strips by adhesive means, assembling a second or outer layer of tapered elements spaced apart leaving channels therebetween, inserting decorating pieces at the lower ends of said channels and securing the same to the strips by adhesive means, providing adhesive material between said two layers and then clamping the same together on a form of desired contour, applying pressure over the entire extension of the outer strips and outer decorating pieces, maintaining said outer strips in desired relative position until the adhesive material has set, then clamping to the outer flaring margin of the structure a rim band of fibrous material provided with adhesive means in such manner as to secure said rim in a plane at right angles with the axis of the horn.

7. The method of making a horn which comprises the following steps, assembling a layer of elements temporarily upon a form, securing said elements together by overlapping strips of flexible material having adhesive substance applied thereto, temporarily securing an outer layer of elements upon said inner layer, in break-joint fashion, and fastening said elements of the outer layer together by adhesive means, then separating the two layers and removing the same from the form, applying an adhesive material between said two layers and assembling the same again in the same relative position and applying clamping pressure thereto to hold all the parts firmly together until the adhesive material has set.

8. The method of making a horn which comprises the assembling first of an inner layer of elements upon a form, temporarily securing said layer to the form, securing said elements to each other by adhesive means, assembling an outer layer of elements upon the inner layer and temporarily securing the same thereto, securing the elements of the outer layer together by adhesive means, then separating the said two layers for the purpose of applying glue between the same and then subjecting said reassembled layers to pressure until the glue has set.

9. The process of making a horn which consists in assembling a plurality of elements or tapered strips together and securing the same with glue, applying a rim band to the outer rim or margin thereof by placing the band in a supporting frame applying adhesive material between the horn and the band and then clamping said horn and band together until the adhesive material is set.

10. The method of making a phonograph horn which consists in forming separate shells of longitudinally extending tapered strips by assembling the strips upon a form and temporarily securing the same thereto, interposing reinforcing pieces of fabric over the joints of said strips and between two of said shells and gluing the same to each shell.

11. The method of making a phonograph horn, which consists in assembling and securing together a plurality of layers of composite strips clamped on a form having the shape of the interior of the horn, then removing the structure so formed from the form and centering the same with respect to a rim clamping device, by engaging with the small opening of the horn structure, a post having a fixed relation with the rim clamping device and then gluing a marginal band to the flaring end of the horn by clamping the same thereto after the horn has been centered with respect to the clamping device.

12. In the manufacture of a flaring wooden phonograph horn the method of forming the larger end of the horn, which consists in separating or spreading the outer ends of adjacent strips of a layer of wood placed upon a form having a flaring contour of the finished horn, applying a reinforcing band or tape provided with an adhesive substance to the outer surfaces of said strips, securing a layer of strips of wood to said first-mentioned strips by adhesive means so as to cover the openings therebetween and the reinforcing band or tape, and clamping said layers together.

13. In the manufacture of a phonograph horn from a number of layers of longitudinally extending strips of fibrous material, the method of forming a superimposing layer of said strips with their longitudinal edges spaced apart, which consists in assembling the strips about a suitably shaped form, placing a ring, having lugs corresponding to the desired spaces between the strips, about said assembled strips and securing the same in the spaced positions.

14. The method of making a horn having a bell shaped flare, which consists in securing onto a horn shaped structure a plurality of longitudinally extending tapered strips, joined together at their longitudinal edges, except near the flaring end of the structure, where the strips separate leaving V-shaped openings, inserting filling pieces at the lower end of the openings and covering with triangular pieces the balance of the openings.

15. The method of making a flaring horn, which consists in securing together upon a wooden form of required shape a layer of longitudinally extending tapered strips, temporarily securing the strips to the form by brads and then securing the strips together by glue and tapes, then removing the brads, then securing a second layer of longitudinally extending tapered strips upon the first layer, temporarily by brads, then securing said strips together by tapes and glue, then removing the brads, and separating the two layers from each other and from the form, then providing glue between the two layers and clamping the layers together upon a heated gluing form.

16. The method of making a flaring horn, which consists in securing together upon a wooden form of required shape a layer of longitudinally extending tapered strips, temporarily securing the strips to the form by brads and then securing the strips together by glue and tapes, then removing the brads, then securing a second layer of longitudinally extending tapered strips upon the first layer, temporarily by brads, then securing said strips together by tapes and glue, then removing the brads and separating the two layers from each other and from the form, then providing glue between the two layers and clamping the layers together upon a heated gluing form, and then removing the horn structure from said heated form and placing it in a rim gluing frame and clamping with glue interposed a rim or ring upon the flaring end of the structure.

17. The method of making a flaring horn, which consists in securing together upon a wooden form of required shape a layer of longitudinally extending tapered strips, temporarily securing the strips to the form by brads and then securing the strips together by glue and tapes, then removing the brads, then securing a second layer of longitudinally extending tapered strips upon the first layer, temporarily by brads, then securing said strips together by tapes and glue, then removing the brads and separating the two layers from each other and from the form, then providing glue between the two layers and clamping the layers together upon a heated gluing form, and then removing the horn structure from said heated form and placing it in a rim gluing frame having a centering device for the small end of the horn structure and a relatively disposed rim clamp, and clamping with glue interposed a rim or ring upon the flaring end of the structure.

ALFRED R. CUNNIUS.

Witnesses:
  A. Moses,
  F. Hirsch.